United States Patent Office
2,831,009
Patented Apr. 15, 1958

2,831,009
ORGANOSILICON BORANES

Dietmar Seyferth, Midland, Mich., assignor to Dow Corning Corporation, Midland, Mich., a corporation of Michigan No Drawing. Application March 5, 1956
Serial No. 569,244

4 Claims. (Cl. 260—448.2)

This invention relates to novel organosilicon boron compounds.

It is the object of this invention to provide novel organosilicon compounds of boron which are soluble in organopolysiloxane fluids and which are useful as oxygen scavengers for such fluids.

Another object is to provide new compositions of matter which are useful in stabilizing lubricants, hydraulic fluids, dielectric fluids, and fluids for electronic devices.

This invention relates to compounds of the formula

in which R and R″ are monovalent hydrocarbon radicals, $x$ is an integer from 0 to 2, R′ is hydrogen or alkyl, $n$ is an integer of at least 1 and Y is a monovalent hydrocarbon radical, a trihydrocarbonyl siloxy radical, or a radical of the formula

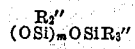

in which $m$ is an integer of at least 1 and R″ is as above defined.

The compounds of this invention may be prepared in one of two ways. The most versatile method is that of reacting a boronfluoride etherate of the formula $R_xBF_{3-x}\cdot Et_2O$ with a Grignard reagent of the formula

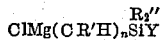

This reaction proceeds under the normal conditions for carrying out a Grignard reaction. The amount of Grignard reagent should be proportional to the amount of fluorine on the boron. The Grignard reagents of the organosilicon compounds are best prepared by reacting magnesium with the corresponding chlorinated organosilicon compounds of the formula $Cl(CR'H)_nSiR_2''Y$. These organosilicon compounds are known materials and may be prepared by the direct halogenation of an alkyl group directly attached to the silicon.

A second method of preparing the compounds of this invention is that of reacting a borane having an olefinic group attached to the boron, with a silicon compound having silicon bonded hydrogens. For example, tributenylborane can be reacted with trimethylsilane in the presence of a platinum catalyst whereby the addition of SiH to the unsaturated linkage in the butenyl groups takes place to give the compounds of this invention.

For the purpose of this invention R and R″ can be any monovalent hydrocarbon radical such as alkyl radicals, such as methyl, ethyl, butyl and octadecyl; alkenyl radicals such as vinyl, allyl and hexenyl; cycloaliphatic radicals such as cyclohexyl, cyclopentyl and cyclohexenyl; aralkyl radicals such as benzyl, and aromatic hydrocarbon radicals such as phenyl, xenyl, tolyl, naphthyl and xylyl.

For the purpose of this invention R′ can be hydrogen or any alkyl radical such as methyl, ethyl or octadecyl. With respect to the R′ groups, it should be understood that where $n$ is greater than 1, some of the R′ can be hydrogen and some alkyl. For example, where the alkylene group is derived from a methallyl radical, only one carbon will have a methyl group attached thereto.

The following examples are illustrative only and should not be construed as limiting the invention which is properly delineated in the appended claims. In the formulas below, the hydrocarbon radicals are designated by the first two letters in their names such as Me for methyl, Ph for phenyl, Vi for vinyl, etc.

Example 1

1.5 mols of Me₃SiCH₂Cl and 1.5 g. atoms of Mg were reacted in 600 ml. of ether and 0.5 mol of BF₃·Et₂O diluted with an equal volume of ether was then added to the Grignard reagent. After addition was complete, the mixture was refluxed for 3½ hours. The mixture was then carefully hydrolyzed with saturated ammonium chloride solution to a point where complete coagulation of the magnesium salts occurred. The organic layer was then separated and the ether was removed by distillation. The residue was distilled to give a single fraction boiling at 78° C. at 1.6 mm. This material was the compound (Me₃SiCH₂)₃B.

Two percent by weight of this material was dissolved in 30 ml. of a 200 cs. trimethylsiloxy end-blocked dimethylpolysiloxane fluid. The mixture absorbed 43 cc. of O₂ under standard conditions of temperature and pressure.

Example 2

1.5 mols of chloromethylpentamethyldisiloxane and 1.5 g. atoms of magnesium were reacted in 500 ml. of ether. The Grignard reagent was cooled in an ice bath and .5 mol of BF₃·Et₂O in 70 ml. of ether was added. The mixture was refluxed for 4 hours and then hydrolyzed as in Example 1. The reaction product was fractionated to give a material boiling 110 to 113° C. at .22 mm. This material was shown by boron, silicon and carbon analysis to be the compound of the formula

Two percent by weight of this material dissolved in 30 ml. of the siloxane in Example 1, absorbed 23 cc. of oxygen under standard conditions of temperature and pressure.

Example 3

55 g. of (Me₃SiOSiMe₂CH₂)₃B was mixed with 445 g. of (Me₂SiO)₄ and 2.56 g. of Me₃SiOK and heated at 170 to 190° C. for 16 hours. The mixture was then cooled and the alkali was neutralized with an equivalent amount of trimethylchlorosilane. The oily product was filtered free of potassium chloride and was found to have the following properties: viscosity at 25° C. 44.2 cs., $n_D^{25}$ 1.4042 and $d_4^{25}$ .9779. The oil was analyzed for boron and was found to contain .275 percent by weight. The fluid product had the formula

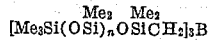

in which $n$ has an average value of 16. 21 g. of this fluid absorbed 10 to 12 cc. of oxygen under standard conditions of temperature and pressure.

Example 4

When 1 mol of dibutylmonofluoroborane is reacted with 1 mol of ClMgCH₂SiMe₃ in the manner of Example 1, the liquid compound Bu₂BCH₂SiMe₃ is obtained.

Example 5

When 3 mols of

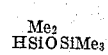

is reacted with 1 mol of trivinylborane in the presence of a small amount of chloroplatinic acid at 100° C., the compound $$(Me_3SiOSiCH_2CH_2)_3B \overset{Me_2}{}$$

is obtained.

Example 6

When 1 mol of hexenyldifluoroborane is reacted with 2 mols of $$ClMgCH_2SiOSiVi \overset{Ph_2Bu_2}{}$$

in the manner of Example 1, the compound $$CH_2{=}CH(CH_2)_4B(CH_2SiOSiVi)_2 \overset{Ph_2Bu_2}{}$$

is obtained.

Example 7

When 1 mol of $$(Me_3SiOSiCH_2)_3B \overset{Me_2}{}$$

is equilibrated with 3 mols of $(PhMeSiO)_4$ in accordance with the method of Example 3, a copolymer fluid having the average formula $$[Me_3SiO(SiO)_4SiCH_2]_3B \overset{Ph\ Me_2}{\underset{Me}{}}$$

is obtained.

Example 8

When 1 mol of $BF_3$ is reacted with 3 mols of $$ClMgCHCHSiMe_3 \overset{Me\ Me}{}$$

in accordance with the method of Example 1, the fluid compound $$B(CHCHSiMe_3)_3 \overset{Me\ Me}{}$$

is obtained.

Example 9

When 1 mol of chlorobenzene, 2 mols of $ClCH_2SiMe_3$ and one mol of $BF_3 \cdot Et_2O$ are mixed and added to 3g. atoms of magnesium in 250 ml. of ether, the fluid product $PhB(CH_2SiMe_3)_2$ is obtained.

That which is claimed is:

1. A composition of matter of the formula $$R_xB[(CR'H)_nSiY]_{3-x} \overset{R_2''}{}$$

in which R and R'' are monovalent hydrocarbon radicals, $x$ is an integer from 0 to 2, R' is of the group consisting of hydrogen and alkyl radicals, $n$ is an integer of at least 1, and Y is of the group consisting of monovalent hydrocarbon radicals, trihydrocarbonyl siloxy radicals and radicals of the formula $$(OSi)_mOSiR_3'' \overset{R_2''}{}$$

in which $m$ is an integer of at least 1 and R'' is as above defined.

2. A compound of the formula $(Me_3SiCH_2)_3B$.
3. A compound of the formula $$(Me_3SiOSiCH_2)_3B \overset{Me_2}{}$$

4. A compound of the formula $$[Me_3SiO(SiO)_mSiCH_2]_3B \overset{Me_2\ Me_2}{}$$

in which $m$ is an integer of at least 1.

References Cited in the file of this patent

UNITED STATES PATENTS

| | | |
|---|---|---|
| 2,434,953 | Patnode | Jan. 27, 1948 |
| 2,611,775 | Barry | Sept. 23, 1952 |